(12) United States Patent
Glatfelter et al.

(10) Patent No.: US 11,465,545 B2
(45) Date of Patent: Oct. 11, 2022

(54) RECONFIGURABLE PODS FOR USE WITH ONE OR MORE VEHICLES

(71) Applicant: The Boeing Company, Chicago, IL (US)

(72) Inventors: John William Glatfelter, Kennett Square, PA (US); Brian Dale Laughlin, Wichita, KS (US)

(73) Assignee: THE BOEING COMPANY, Chicago, IL (US)

( * ) Notice: Subject to any disclaimer, the term of this patent is extended or adjusted under 35 U.S.C. 154(b) by 54 days.

(21) Appl. No.: 16/444,404

(22) Filed: Jun. 18, 2019

(65) Prior Publication Data

US 2020/0398732 A1 Dec. 24, 2020

(51) Int. Cl.
*B60P 3/00* (2006.01)
*B60P 3/32* (2006.01)

(52) U.S. Cl.
CPC ..................... *B60P 3/32* (2013.01)

(58) Field of Classification Search
CPC ........ B64C 2211/00; B64C 2011/0046; B62D 21/10; B62D 24/00; B62D 63/025; B62D 31/00; B62D 31/025; B64D 11/00; B65G 63/004
USPC ......... 244/118.2, 137.1, 137.2; 414/340, 341
See application file for complete search history.

(56) References Cited

U.S. PATENT DOCUMENTS

| | | | |
|---|---|---|---|
| 2,388,380 A * | 11/1945 | Bathurst | ................... B64C 1/22 244/118.2 |
| 3,101,919 A | 8/1963 | Madon | |
| 3,423,121 A * | 1/1969 | Lipkin | ............... B64D 11/0023 244/121 |
| 3,767,253 A * | 10/1973 | Kluetsch | .................. B60P 7/14 410/118 |
| 4,664,340 A | 5/1987 | Jackson | |
| 4,699,336 A | 10/1987 | Diamond | |
| 4,890,083 A * | 12/1989 | Trenkler | ............ H01B 11/1008 335/301 |
| 5,065,162 A | 11/1991 | Akaba et al. | |

(Continued)

FOREIGN PATENT DOCUMENTS

| | | |
|---|---|---|
| RU | 144783 U1 | 8/2014 |
| UA | 88319 U | 3/2014 |

OTHER PUBLICATIONS

Tucker, P., Why Your Plane Can't Have an Escape Pod, Defense One, Nov. 24, 2015, Retrieved from the internet: URL: https://www.defenseone.com/technology/2015/11/why-your-plane-cant-have-escape-pod/123989/ [retrieved on Jan. 31, 2020], pp. 1-5.

(Continued)

*Primary Examiner* — Stephen T Gordon
(74) *Attorney, Agent, or Firm* — Coats & Bennett, PLLC

(57) ABSTRACT

A modular transportation system to transport one or more persons and/or objects. The system may include a pod with wall segments that mount together to form an interior space to house the one or more persons and/or objects. The wall segments are modular and configured to connect together in a variety of different configurations to selectively configure the interior space. Vehicles are each configured to individually connect to the pod and to transport the pod from a first location to a second location. At least one of the vehicles is configured to transport the pod by land and at least one of the vehicles is configured to transport the pod by air.

20 Claims, 13 Drawing Sheets

(56) References Cited

U.S. PATENT DOCUMENTS

| | | | |
|---|---|---|---|
| 6,392,538 B1 | 5/2002 | Shere | |
| 6,494,404 B1 | 12/2002 | Meyer | |
| 6,682,017 B1 | 1/2004 | Giannakopoulos | |
| 7,344,109 B1* | 3/2008 | Rezai | B64D 9/00 244/118.2 |
| 9,322,897 B1 | 4/2016 | Hoffman et al. | |
| 10,303,171 B1 | 5/2019 | Brady et al. | |
| 10,545,509 B1 | 1/2020 | Jessen et al. | |
| 2002/0172571 A1 | 11/2002 | Lawrence | |
| 2005/0247824 A1 | 11/2005 | Allison, Sr. | |
| 2006/0079291 A1 | 4/2006 | Granovetter et al. | |
| 2008/0131226 A1* | 6/2008 | Pesson | B60P 7/14 410/129 |
| 2011/0233341 A1 | 9/2011 | Monteforte | |
| 2014/0160550 A1* | 6/2014 | Brown | G02F 1/13318 359/275 |
| 2014/0302810 A1 | 10/2014 | Inha et al. | |
| 2015/0266666 A1* | 9/2015 | Wong | B65D 88/12 220/1.5 |
| 2017/0124836 A1 | 5/2017 | Chung et al. | |
| 2017/0251096 A1 | 8/2017 | Koepke | |
| 2019/0106021 A1 | 4/2019 | Dietrich et al. | |
| 2019/0271988 A1 | 9/2019 | High et al. | |
| 2020/0047692 A1 | 2/2020 | Park et al. | |
| 2021/0183214 A1 | 6/2021 | Attariani et al. | |

OTHER PUBLICATIONS

Star Wars, Escape Pod, Retrieved from the internet: URL: https://www.starwars.com/databank/escape-pod [retrieved on Jan. 31, 2020], pp. 1-4.

Tablang, K., "This Intriguing Aircraft Concept Aims to Eliminate Airport Lines and Terminals", ForbesLife, Retrieved from the internet: URL:https://www.forbes.com/sites/kristintablang/2016/07/12/clip-air-concept-ecole-polytechnique-federale-de-lausanne-switzeriand/?sh=7421b65a2283 [retrieved on Jun. 17, 2022], Jul. 12, 2016, pp. 1-6.

* cited by examiner

RECONFIGURABLE PODS FOR USE WITH ONE OR MORE VEHICLES

TECHNOLOGICAL FIELD

The present disclosure relates generally to the field of transportation and, more specifically, to transportation using pods that can be connected to vehicles.

BACKGROUND

Much of a traveler's time is spent moving from one environment to another. For example, a business traveler that travels from their office to a business meeting in a remote city moves through a number of different environments. This can initially include a first vehicle, such as a car or public transportation vehicle to travel from their office to the airport. This can also include the interior of the airport while moving through security and waiting at the airline gate. Another environment includes the one or more aircraft used for traveling to the city where the meeting is located. This can then also include another transportation vehicle to travel from the airport to the meeting.

The traveler is required to physically move into and out of each of these environments during their trip. This includes getting into an out of vehicles, sitting in waiting areas, sitting on the aircraft, moving through security, etc. Further, the traveler is required to closely monitor the time to ensure they are at the correct location at the correct time. This movement and monitoring of time makes it difficult for the traveler to be productive. Further, the required effort can be exhausting to the traveler.

SUMMARY

One aspect is directed to a modular transportation system to transport one or more persons, one or more objects, or a combination of persons and objects. The system includes a pod with wall segments that mount together to form an interior space to house the one or more persons or objects. The wall segments are modular and configured to connect together in a variety of different configurations to selectively configure the interior space. A plurality of vehicles are each configured to individually connect to the pod and to transport the pod from a first location to a second location. At least one of the vehicles is configured to transport the pod by land and at least one of the vehicles is configured to transport the pod by air.

In another aspect, one or more of the wall segments include: one or more floor wall segments; one or more roof wall segments; and one or more lateral sidewall segments configured to connect to the one or more floor wall segments and the one or more roof wall segments in multiple different locations with each of the wall segments including an interior side that faces inward towards the interior space and an exterior side that faces outward away from the interior space.

In another aspect, one or more partitions are configured to be mounted within the interior space at different locations with each of the variety of different configurations of the pod including the wall segments in a base configuration and the one or more partitions mounted at the different locations within the interior space.

In another aspect, the interior space includes a common square foot area in each of the different configurations of the pod.

In another aspect, the interior space includes a different square foot area in two or more of the different configurations of the pod.

In another aspect, at least one of the wall segments includes a window that aligns with a window on one of the vehicles when the pod is connected to the vehicle.

In another aspect, one or more of the wall segments include openings and one or more of the wall segments includes extensions sized to fit into the openings with the extensions configured to fit into different ones of the openings to connect the wall segments together in the variety of different configurations to selectively configure the interior space.

In another aspect, one or more of the wall segments are magnetic to form an electromagnetic shield around the interior space.

In another aspect, the wall segments are connected together to form a seal for the interior space to be waterproof.

In another aspect, one or more of the wall segments are opaque and one or more of the wall segments are translucent.

In another aspect, one or more of the vehicles includes wheels that are driven by an engine to transport the pod by land and one or more of the vehicles includes an aircraft engine to transport the pod by air.

One aspect is directed to a modular transportation system to transport one or more persons or objects. The system includes a pod with wall segments that mount together to form an interior space to house the one or more persons or more objects or a combination of persons and objects, and a track system with slots and extensions positioned on one or more of the wall segments to connect the one or more wall segments together at a variety of different orientations to selectively configure the interior space. A plurality of vehicles are each configured to individually connect to the pod and to transport the pod from a first location to a second location. At least one of the vehicles is configured to transport the pod by land and at least one of the vehicles is configured to transport the pod by air.

In another aspect, the wall segments form a first pod section and a second pod section with the first and second pod sections including a fixed size and are configured to move relative to one another with the track system to adjust a size of the interior space.

In another aspect, the first and second pod sections are in a telescoping arrangement.

One aspect is directed to a method of transporting one or more persons, one or more objects, or a combination of persons and objects. The method includes: configuring a pod into a first configuration by connecting together wall segments and forming an interior space with a first layout; attaching the pod to a first vehicle at a first geographic location and transporting the pod from the first geographic location to a remote second geographic location; at the second geographic location, reconfiguring the pod into a second configuration by connecting together the wall segments in a different arrangement and forming the interior space into a different second layout; and attaching the pod to a second vehicle at the second geographic location and transporting the pod from the second geographic location to a remote third geographic location.

In another aspect, the method includes transporting the pod by land from the first geographic location to the second geographic location and transporting the pod by air from the second geographic location to the third geographic location.

In another aspect, the method includes changing a size of an area of the interior space when reconfiguring the pod from the first configuration to the second configuration.

In another aspect, the method includes sliding one or more of the wall segments along a slot in another one of the wall segments and changing the interior space into the different second configuration.

In another aspect, the method includes attaching a floor of the pod to the first vehicle and the second vehicle and maintaining an orientation of the interior space when transporting the pod from the first geographic location to the third geographic location.

In another aspect, the method includes mounting one or more partitions to one or more of the wall segments and changing the pod from the first configuration to the second configuration and without adjusting the wall segments.

The features, functions and advantages that have been discussed can be achieved independently in various aspects or may be combined in yet other aspects, further details of which can be seen with reference to the following description and the drawings.

DETAILED DESCRIPTION

Figure 1:
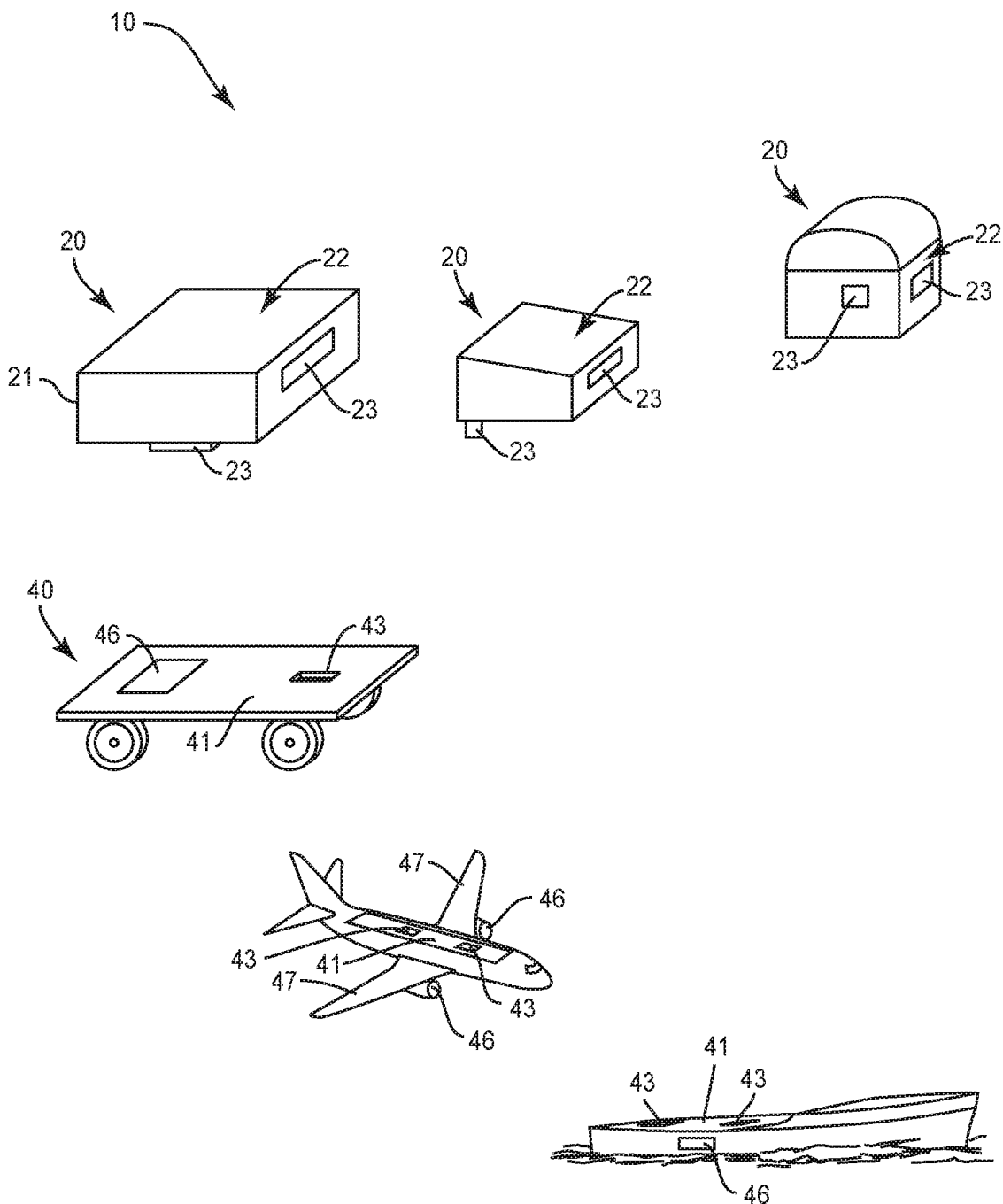
FIG. 1 is a schematic diagram of a transportation system that includes one or more pods and one or more vehicles.

FIG. 1 illustrates a transportation system 10 that includes one or more pods 20. The pods 20 include an interior space 22 configured to house one or more travelers. The pods 20 can be attached to and transported by multiple different vehicles 40. The different vehicles 40 can provide for different modes of transportation depending upon the plans of the travelers. Different modes include but are not limited to ground travel, air travel, water travel, and rail travel (e.g., train).

Each of the pods 20 includes one or more connectors 23 and the vehicle 40 includes one or more connectors 43. The connectors 23, 43 provide for the pods 20 to mechanically engage with the vehicles 40 in a secure manner during the transportation. This engagement can also provide for one or more of electrical power, communication systems, and HVAC to be supplied from the vehicle 40 to the pod 20 during the transportation.

During use, a traveler is housed within the pod 20. The pod 20 can be attached to and transported by one or more vehicles 40 during a trip. For example, the pod 20 can be initially connected to and transported by a land-based vehicle 40 for transportation to an airport. The pod 20 can then be connected to and transported by an aircraft 40 for transportation to a remote destination. During the travel with the two separate vehicles 40, the traveler remains within the pod 20 with little to no interruptions that would otherwise occur during their travel.

Figure 2:
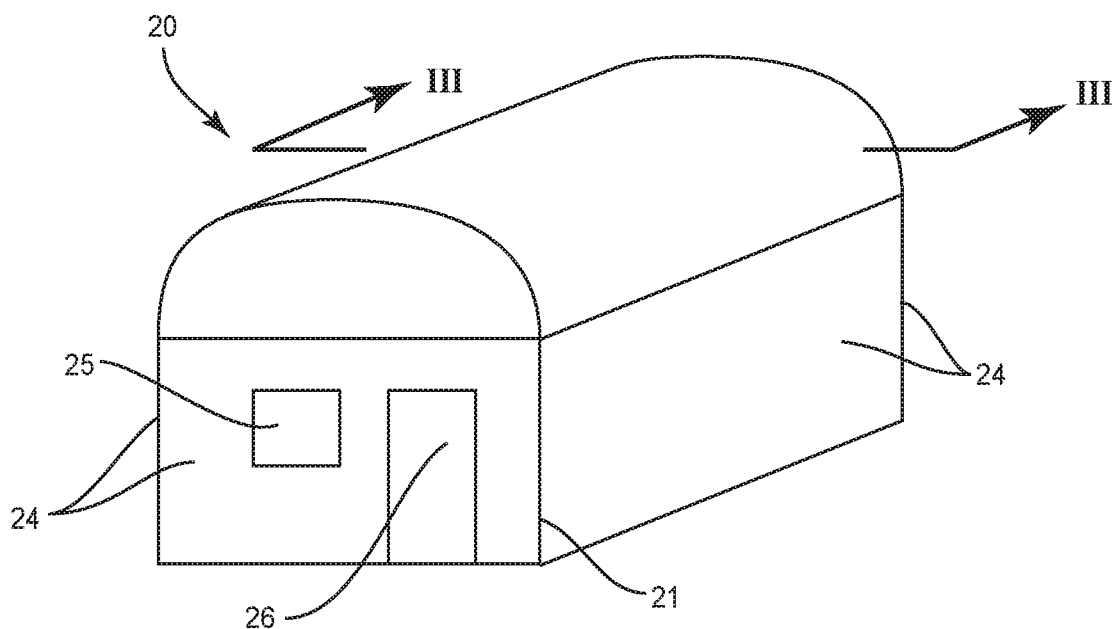
FIG. 2 is a schematic perspective view of an exterior of a pod.

FIG. 2 illustrates a pod 20 that includes a frame 21 that extends around and forms the interior space 22. The frame 21 can include one or more wall segments 24 that can be configured in various shapes and sizes. One or more of the wall segments 24 can be opaque to provide for privacy within the interior space 22. One or more of the wall segments 24 can be translucent to allow light from the exterior to enter into the interior space 22. The wall segments 24 can include an interior side that faces inward towards the interior space 22 and an exterior side that faces outward away from the interior space 22. The wall segments 24 can be connected together and form a seal for the interior space 22 to be waterproof to protect the travelers and/or objects.

One or more windows 25 can extend through one or more of the wall segments 24 to allow the travelers to view their environment during travel. One or more doors 26 provide for access into and out of the interior space 22. The windows 25 and doors 26 can be configured to be closed or opened during travel. For example, the windows 25 can be opened to provide air into the interior space 22 during travel on the ocean.

Figure 3:
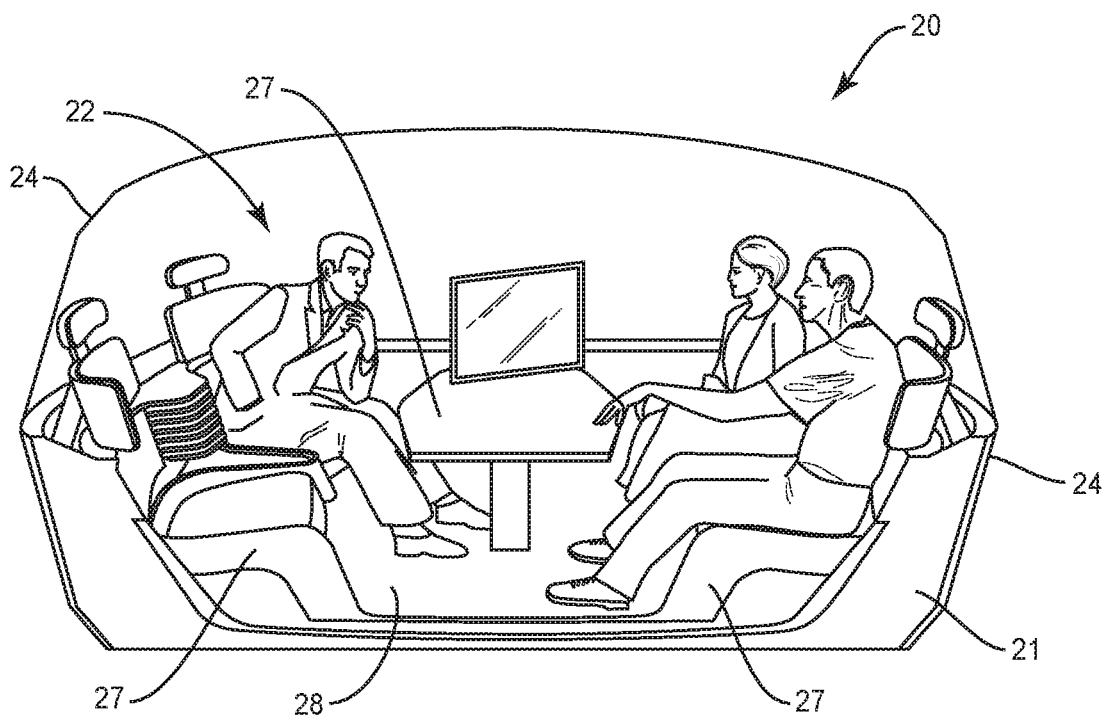
FIG. 3 is a section view cut along line of FIG. 2.

FIG. 3 illustrates an interior space 22 configured as a meeting space. Furniture 27 such as chairs, tables, and couches are positioned to facilitate the meeting. In one example, the furniture 27 is secured to the floor 28. This provides for the furniture 27 to remain upright during movement of the pod 20. This movement can be caused by various forces, such as but not limited to turbulence during flight, wave motion during sea travel, vibrations during land travel, or movement of the pod 20 from one vehicle 40 to another. In one example, some of the furniture 27 remains unattached and are freely movable by the travelers around the interior space 22.

The interior space 22 is designed to facilitate the traveler's needs during travel. This can include but is not limited the interior space 22 configured as a meeting space during business travel, a bedroom for overnight travel, various general seating arrangements for business and social travel, as an office with one or more desks, a theater arrangement to watch movies during travel, and various other arrangements.

Figure 4:
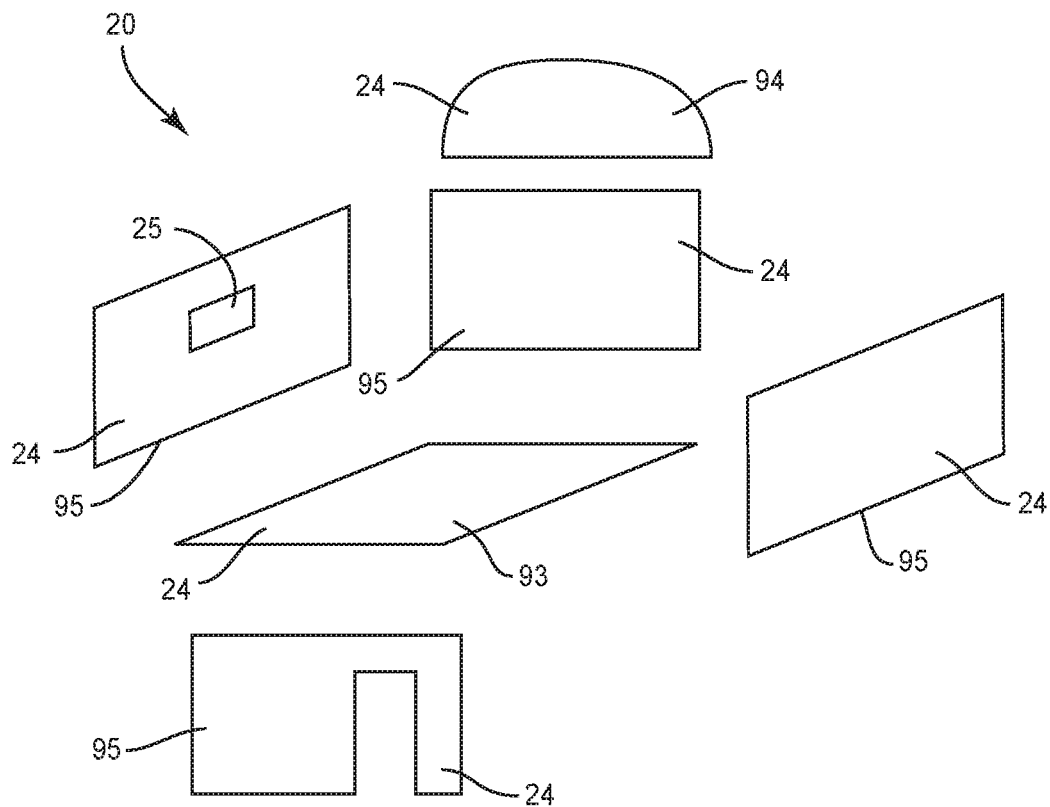
FIG. 4 is an exploded schematic view of wall segments that can be connected together to form a pod.

FIG. 4 illustrates an exploded view of a pod 20 that includes various wall segments 24. The wall segments 24 include the floor 93, roof 94, and lateral sides 95. The wall segments 24 can be assembled in to form a variety of different constructions. The constructions can include different exterior shapes and sizes, as well as different interior shapes and sizes.

Figure 5:
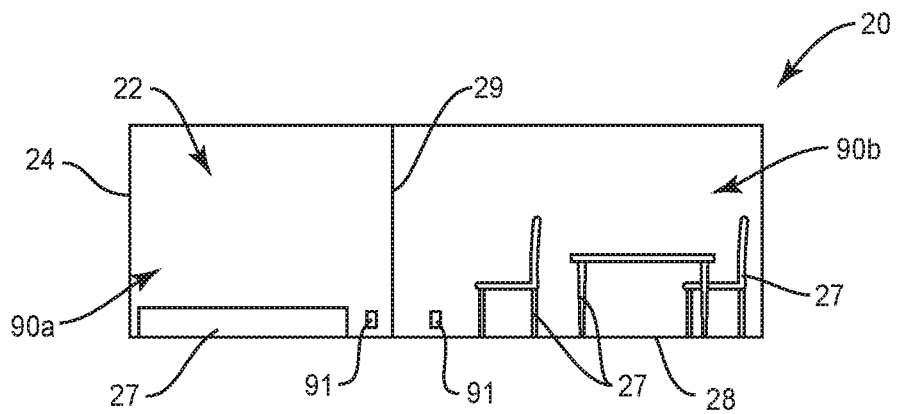
FIG. 5 is a side schematic view of furniture positioned within an interior space of a pod.

FIG. 5 includes a format for sleeping that includes a bed 27 and one or more chairs 27. One or more partitions 29 can also be mounted to divide the interior space 22 into separate compartments 90. FIG. 4 includes a partition 29 dividing the interior space 22 into a first compartment 90a with furniture such as a bed 27 for sleeping, and a second compartment 90b with furniture 27 such as chairs and a table. The partition 29 can be configured to attach to one or more of the wall segments 24.

Figure 6:
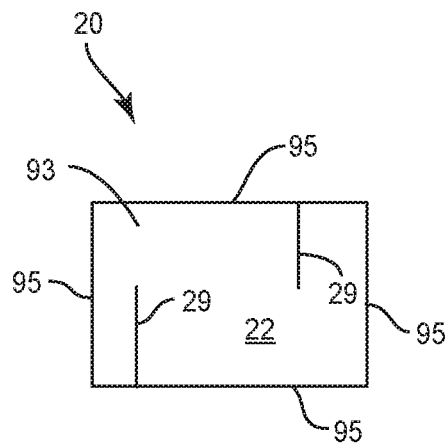
FIG. 6 is a schematic plan view of an interior space of a pod.
Figure 7:
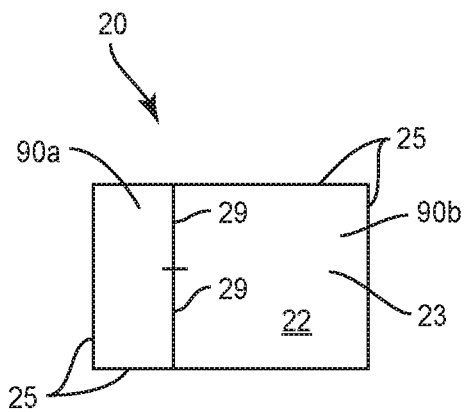
FIG. 7 is a schematic plan view of an interior space of a pod.
Figure 8:
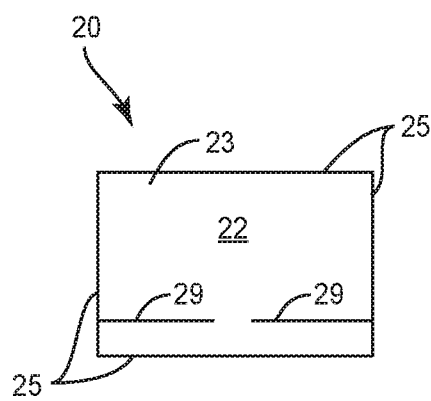
FIG. 8 is a schematic plan view of an interior space of a pod.

FIG. 6 illustrates a top view of a pod 20 with a configuration for the interior space 22. Partitions 29 extend outward from opposing lateral sides 95. The partitions 29 are spaced apart and form separate isolated sections of the interior space 22. FIG. 7 includes a pod 20 with an interior space 22 that includes a pair of partitions 29 aligned in a row and forming a wall across the interior space 22. A door can extend through at least one of the partitions 29 to access the different compartments 90a, 90b. FIG. 8 includes an interior space 22 with a pair of partitions 29 aligned in a row and spaced apart to form an opening that leads into an isolated section.

In one example, the wall segments 24 can be assembled in a base configuration. For example, the base configuration can include a rectangular configuration with a floor 93, roof 94, and lateral sides 95. The interior space 22 can be changed based on mounting one or more of the partitions 29 at different locations in the interior space 22. This can include the pod 20 having the same base configuration with the same footprint (i.e., the base has the same physical dimensions), but with different interior configurations using one or more of the partitions 29. In one example, each of the base configurations of the pod 20 has a common square foot area. In another example, the base configurations can include different sizes having different square foot areas. In configurations with different sizes, one or more of the lateral sides 95 can be located at different positions relative to the roof 94 and/or floor 93.

Figure 9:
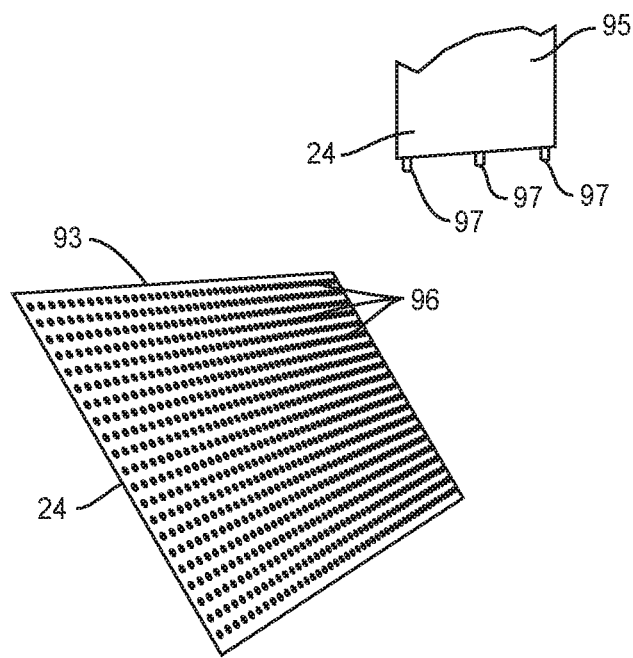
FIG. 9 is a perspective view of a wall segment that has openings.

The wall segments 24 can be connected together in a variety of different manners. FIG. 9 illustrates an example with one of the wall segments 24 (such as a floor 93) having openings 96. One or more of the other wall segments 24 (such as the lateral sides 95) include one or more extensions 97. The extensions 97 are sized and shaped to be inserted into the openings 96. This provides for positioning and supporting the wall segments 24 as desired relative to one another.

Figure 10:
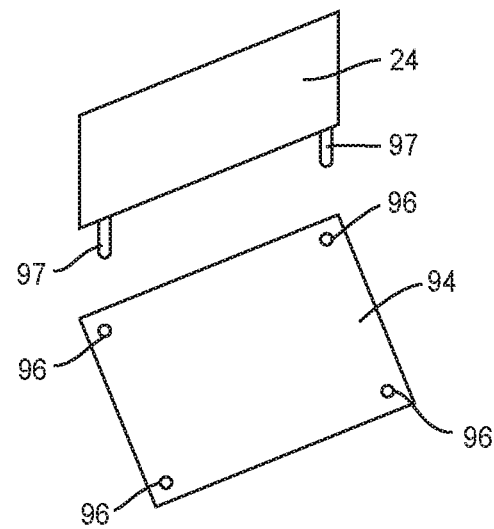
FIG. 10 is a perspective exploded view of wall segments configured to be connected together.

The openings 96 can be arranged in a variety of different configurations. FIG. 9 includes openings 96 positioned across the entirety of the wall segment 24. Corresponding wall segments 24 with extensions 97 can be positioned at various positions to engage with the openings 96. FIG. 10 includes a wall segment 24 with openings 96 just at the corners. This alignment of openings 96 is configured to receive the extensions 97 of a corresponding wall segment 24 in more limited positions.

The wall segments 24 can further form a track system with rails and mounts to selectively connect and position the wall segments 24 to form the interior space 22. The track system provides for adjustability of the configuration of the pod 20, and also secure attachment between the various wall segments 24.

Figure 11:
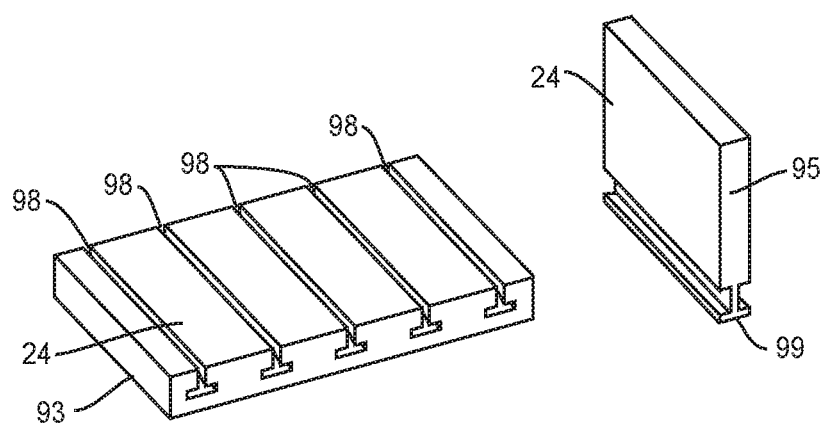
FIG. 11 is a perspective exploded view of wall segments configured to be connected together.
Figure 12:
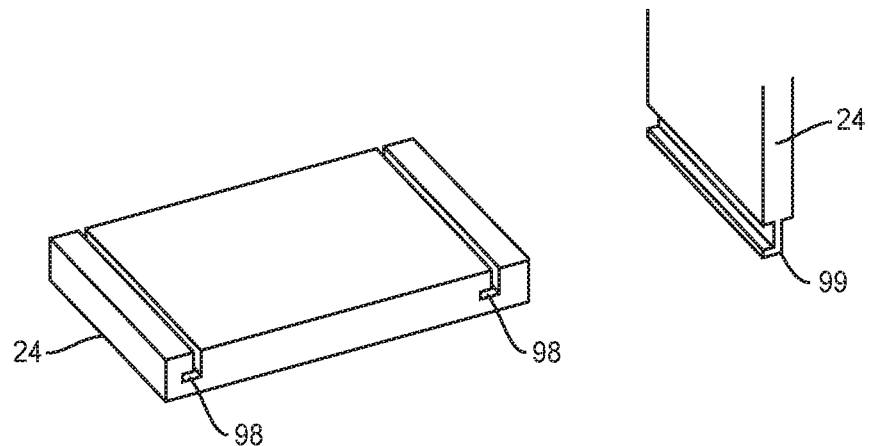
FIG. 12 is a partial perspective exploded view of wall segments configured to be connected together.

FIGS. 11 and 12 illustrate wall segments 24 for use as a track system. The wall segments 24 have slots 98 and mating wall segments 24 have extensions 99. The extensions 99 are sized to fit into and slide along one or more of the slots 98. During assembly of the pod 20, the extensions 99 are aligned with the applicable slots 98 and slid along the slots 98 to the desired position.

FIG. 11 includes a wall segment 24 that includes a series of slots 98. The slots 98 can extend along an entirety of the wall segment 24, or just along a limited section. Mating wall segments 24 include extensions 99 sized and shaped to complement the slots 98. The extensions 99 can be aligned with and slid along the slots 98 to the desired location. In one example as illustrated in FIG. 11, a single extension 99 fits into a single slot 98. Other examples can include two or more extensions 99 that mate with two or more corresponding slots 98.

The shape of the slots 98 and extensions 99 can vary. FIG. 11 includes the slots 98 and extensions 99 each including sectional shapes that resemble a T. This shape provides for the wall segment 24 with the extension 99 to be inserted into an end of the slot 98 and slid along the slot 98. The T shape prevents the extension 99 from being removed directly outward from the opposing wall segment 24.

FIG. 12 includes the slots 98 and extensions 99 each including a sectional shape that resembles an L. This shape can provide for the extension 99 to be attached in the slot 98 by rotation of the wall segment 24. The leading tip of the extension 99 is aligned with the slot 98 and the wall segment 24 is then rotated thus snapping the extension 99 into the slot 98. This design can provide for attachment of the wall segments 24 without requiring sliding. Various other shapes can be used for the slots 98 and extensions 99, including but not limited to a rectangular sectional shape.

The wall segments 24 can also be connected together using one or more mechanical fasteners, including but not limited to bolts, rivets, and screws. The mechanical fasteners can be used with or without the various other attachment mechanisms.

The interior partitions 29 can also be connected to one or more wall segments 24 in a similar manner. The connections can provide for removing and repositioning the partitions 29 as needed.

Figure 13:
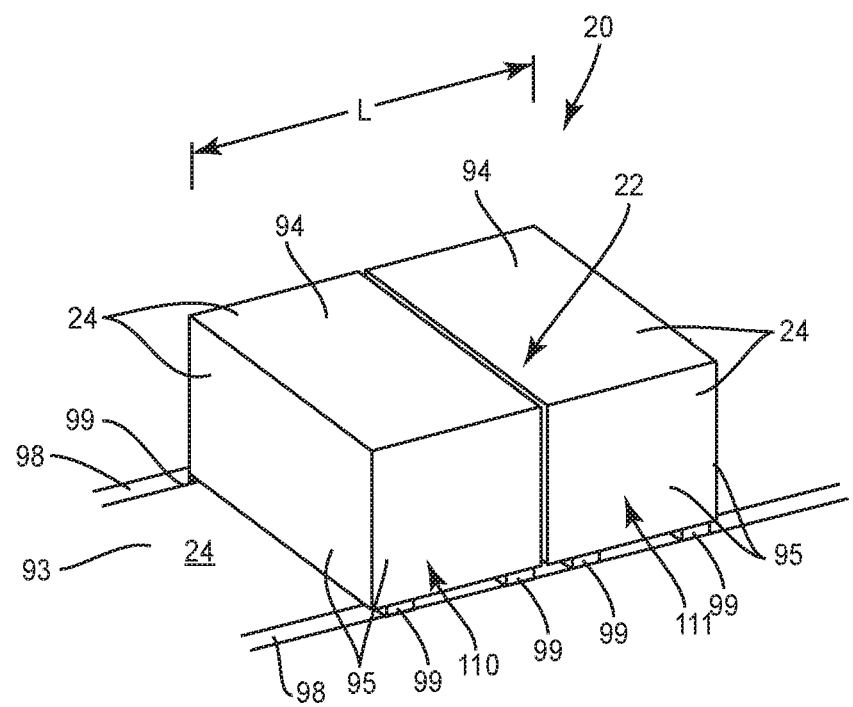
FIG. 13 is a perspective view of a pod constructed from first and second sections.

The pods 20 can be configured to adjust the size of the interior space 22. FIG. 13 illustrates a pod 20 that is constructed from sections 110, 111 that are mounted on a floor 93. The sections 110, 111 are in a telescoping arrangement with the first pod section 110 positioned within the second pod section 111. Each of the sections 110, 111 includes multiple wall segments 24. In one example as illustrated in FIG. 13, each section 110, 111 includes lateral sides 95 and a roof 94. The interior lateral sides are open so the two sections 110, 111 form a single interior space 22. The sections 110, 111 can be individually moved along the floor 93 and positioned relative to each other to adjust a length L of the pod 20 and thus the size of the interior space 22 as desired by the traveler.

In one example, one or both of the sections 110, 111 include wall segments 24 with extensions 99 that are mounted within slots 98 of a floor 93. The sections 110, 111 are movable relative to one another along the slots 98 to adjust the length L of the pod 20. In this manner, the sections 110, 111 include a telescoping configuration that provides for selective adjustability.

Figure 14:
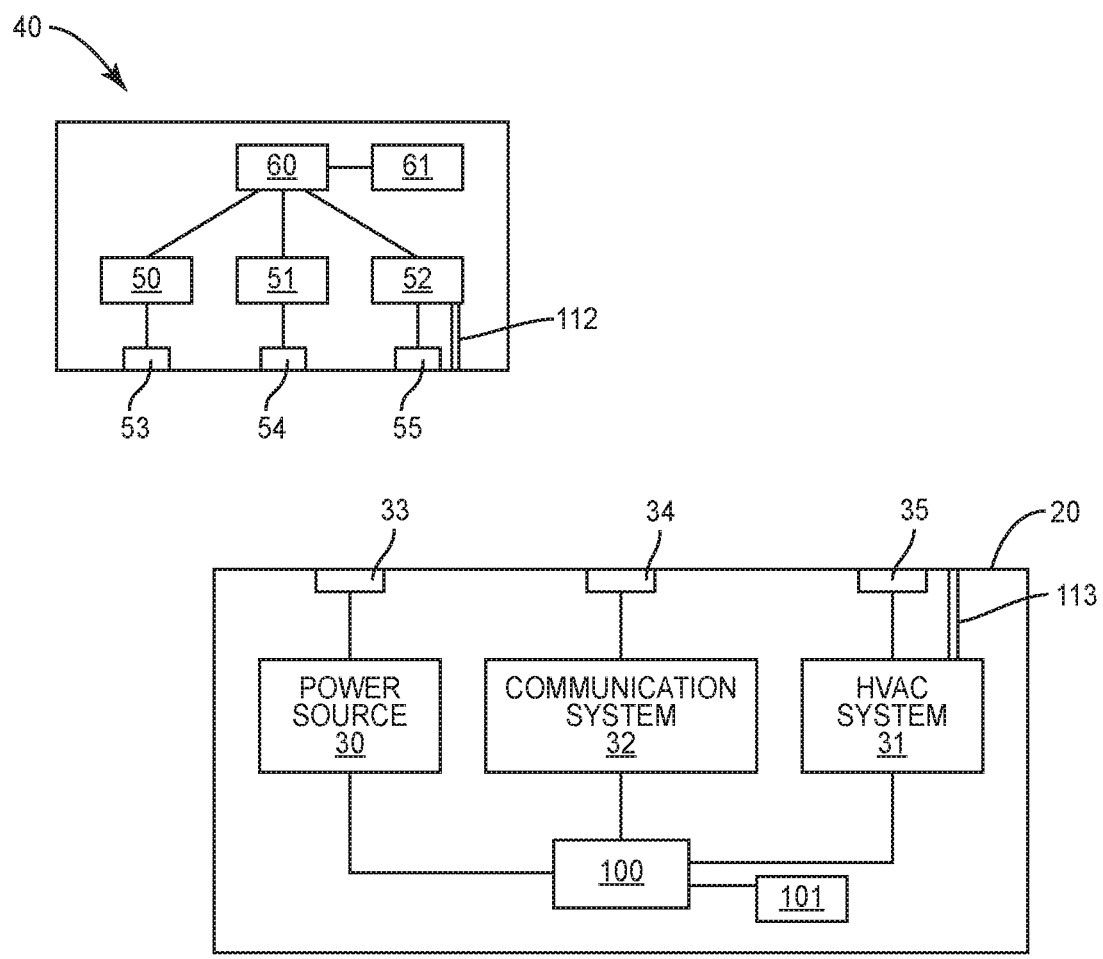
FIG. 14 is a schematic diagram of functional utilities of a pod and functional utilizes of a vehicle.

The pods 20 can each be equipped with one or more utility systems. As illustrated in FIG. 14, this can include a power source 30 to power various electrical components. The components can be mounted within the interior space 22, such as a television or lights. The power source 30 can include one or more outlets 91 (see FIG. 5) to supply power to the travelers own components (e.g., laptop computer, phone charger). The power source 30 can include one or more batteries. One or more solar panels can be positioned on an exterior wall segment 24 and connected to the one or more batteries for recharging.

One utility function includes a heating and air conditioning system (HVAC) 31 to control the air temperature within the interior space 22. The HVAC system 31 can include one or more heating units and cooling units. Ducting can extend throughout the pod 20 to distribute the conditioned air.

A communication system 32 can provide for communications with remote entities. This can include communication over a mobile communication network (e.g., a WCDMA, LTE, or WiMAX network). This can also include communication with a local area network, and can operate according to the 802.11 family of standards, which is commonly known as a WiFi interface. The communication system 32 can also provide for satellite communications.

The pods 20 can also include a control processor 100 and memory circuit 101. The control processor 100 controls overall operation of the pod 20 including one or more of the functional utilities according to program instructions stored in memory circuit 101. The control processor 100 can include one or more circuits, microcontrollers, microprocessors, hardware, or a combination thereof. Memory circuit 101 includes a non-transitory computer readable storage medium storing program instructions, such as a computer program product, that configures the control processor 100 to implement one or more of the techniques discussed herein. Memory circuit 101 can include various memory devices such as, for example, read-only memory, and flash memory. Memory circuit 101 can be incorporated with the control processor 100, or the two can be separate.

The vehicles 40 can also each be equipped with one or more utility systems. As illustrated in FIG. 14, this can include a power source 50 such as one or more batteries. The vehicles 40 can also include a communication system 51 for communications over one or more of a mobile communication network (e.g., a WCDMA, LTE, or WiMAX network), local area network that can operate according to the 802.11 family of standards. The communication system 51 can also provide for satellite communications. An HVAC system 52 can include one or more heating units and cooling units, as well as ducting that 112 extends throughout the vehicle 40 to distribute the conditioned air. These functional utilities support the vehicle 40. For example, the communication system 51 provides for the vehicle 40 to communicate with one or more remote entities. The HVAC system 52 provides heating and cooling to the vehicle 40.

Each of the vehicles 40 can also include a control processor 60 and memory circuit 61. The control processor 60 can include one or more circuits, microcontrollers, microprocessors, hardware, or a combination thereof. Memory circuit 61 includes a non-transitory computer readable storage medium storing program instructions, such as a computer program product, that configures the control processor 60 to implement one or more of the techniques discussed herein. Memory circuit 61 can include various memory devices such as, for example, read-only memory, and flash memory. Memory circuit 61 can be incorporated with the control processor, or the two can be separate.

When the pod 20 is connected to the vehicle 40, one or more of the functional utilities can also provide utility to the pod 20. As illustrated in FIG. 14, one or more of the functional systems include connectors 53, 54, 55 respectively, to provide the corresponding utility to the pod 20. The pod 20 includes corresponding connectors 33, 34, 35 that connect to the connectors 53, 54, 55 when the pod 20 is attached to the vehicle 40. This provides for the vehicle 40 to provide one or more of the utilities to the pod 20.

In one example, the utility systems on the pod 20 continue to operate when the pod 20 is attached to the vehicle 40. For example, the HVAC system 31 continues to control the air temperature within the interior space 22. Communication system 32 can continue to operate to provide communications with outside entities. In another example, the corresponding utility system on the pod 20 is deactivated when the pod 20 is connected to the vehicle 40 and the vehicle 40 can supply the corresponding utility. For example, the HVAC system 51 from the vehicle 40 provides conditioned air to the interior space 22 and the HVAC system 31 is deactivated. The corresponding connectors 35, 55 can include ducting 112, 113 to provide for the passage of the conditioned air from the vehicle 40 to the pod 20. In another example, the power source 50 can provide power to the pod 20 when the corresponding connectors 33, 53 are connected, and the power source 30 is deactivated.

The pod 20 and vehicle 40 can each include the same utility systems. In another example, the pod 20 and vehicle 40 can include different utility systems. For example, the vehicle 40 can include a communication system 51 but the pod 20 does not include its own communication utility. Thus, the pod 20 is not able to support communications when detached from the vehicle 40. Once attached, the pod 20 can be connected to the communication system 51 in the vehicle 40 and provide this utility to the traveler.

The pods 20 and vehicles 40 can include a variety of different utility systems. Examples include but are not limited to power sources, communication system, HVAC systems, and plumbing/water systems.

Figure 15:
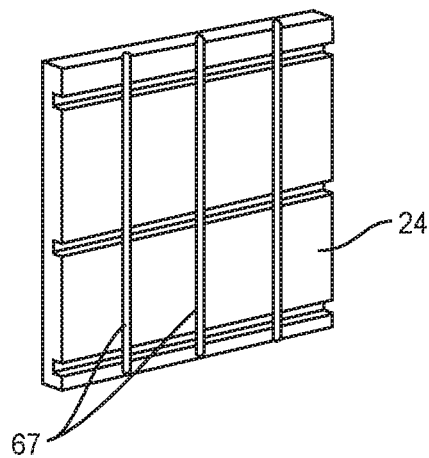
FIG. 15 is a schematic diagram of a wall segment that includes one or more metallic members.

The interior space 22 can be isolated to prevent eavesdropping or otherwise listening to communications. In one design, one or more of the wall segments 24 include metallic members 67 and can be magnetic. As illustrated in FIG. 15, the metallic members 67 can span along the wall segment 24 and can form an electromagnetic shield. In one example, the one or more members 67 are connected to the power source 30 and form a coil that creates an electromagnetic field that prevents outside interception of the communications.

Figure 16:
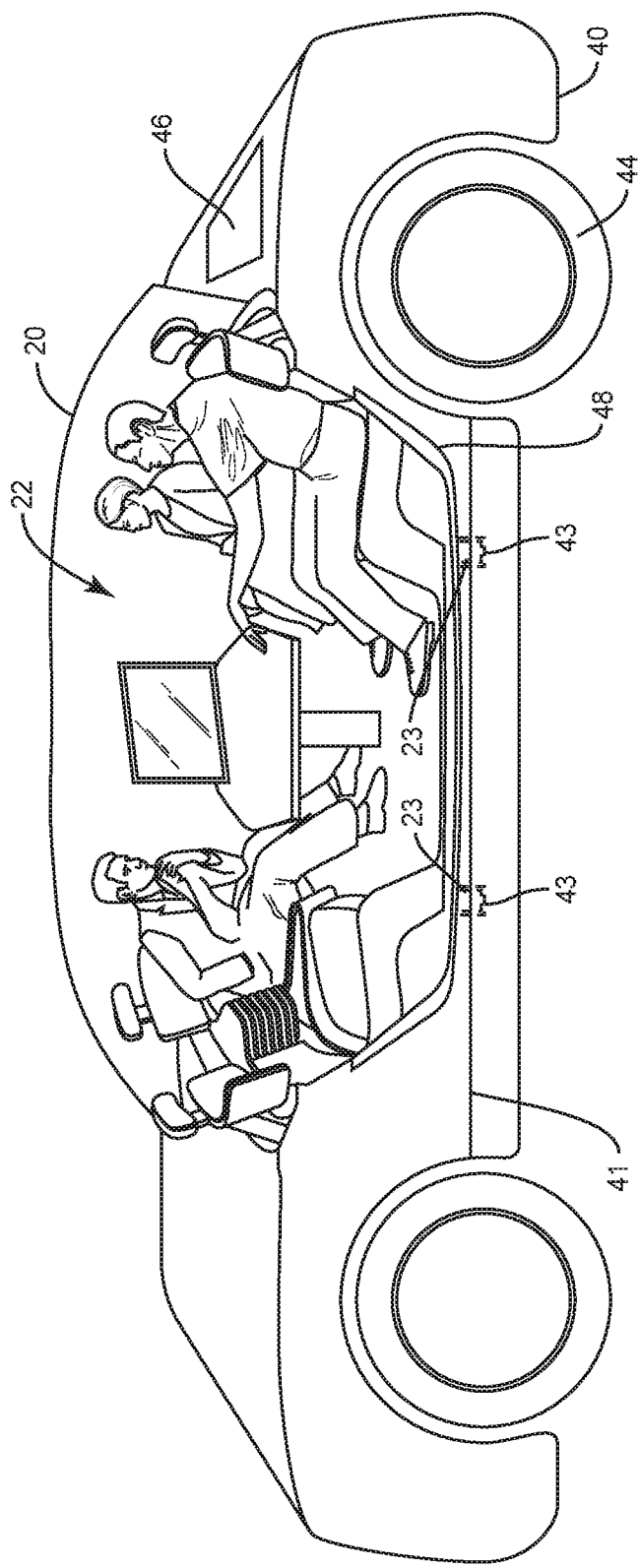
FIG. 16 is a side schematic cut-away view of an interior space of a pod that is attached to a vehicle.

Various different types of vehicles 40 can connect to and transport the pod 20. One type of vehicle 40 is configured to transport the pod 20 over land. FIG. 16 illustrates an example of a land-based pod 20 that includes a base 41 that supports the pod 20. The base 41 includes a receptacle 48 that receives the pod 20. The vehicle 40 can also include one or more wheels 44 that are driven by an engine 46 for transportation over land.

One or more connectors 43 can be positioned at the base 41 to connect to the pod 20. The connectors 43 can provide for a mechanical connection to prevent detachment when the vehicle 40 is transporting the pod 20. In one example, one or more of the connectors 43 can also include one or more of the connectors 53, 54, 55 for operatively connecting the pod 20 to one or more functional systems in the vehicle 40.

Figure 17:
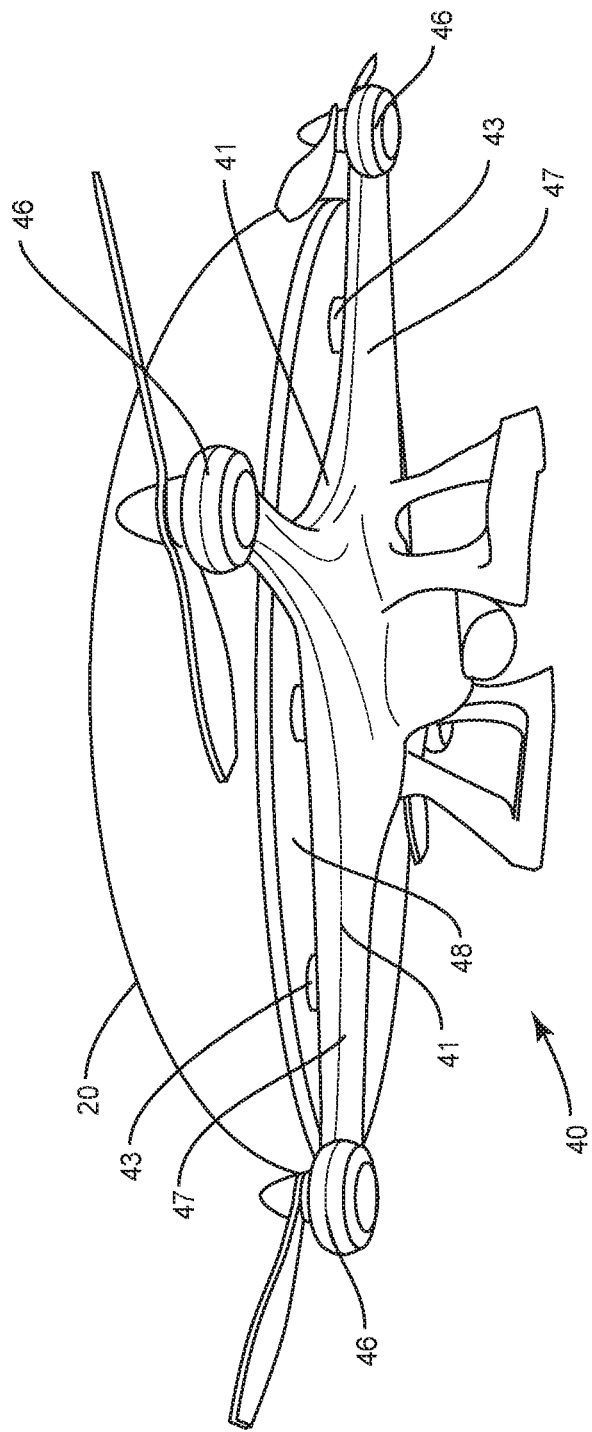
FIG. 17 is a perspective view of a pod connected to a vehicle.

FIG. 17 illustrates a vehicle 40 that provides for air transportation of a pod 20. The vehicle 40 includes a base 41 with a receptacle 48 that receives the pod 20. One or more connectors 43 connect the pod 20 to the base 41. The vehicle 40 also includes wings 47 and engines 46 that provide for flight. A control position 49, such as a cockpit, provides for a pilot to control the transportation. Other vehicles 40 can provide for autonomous transportation and thus may not include a control position 49.

The vehicles 40 can be driven by one or more engines 46. The engines 46 can also include a propulsion system.

Figure 18:
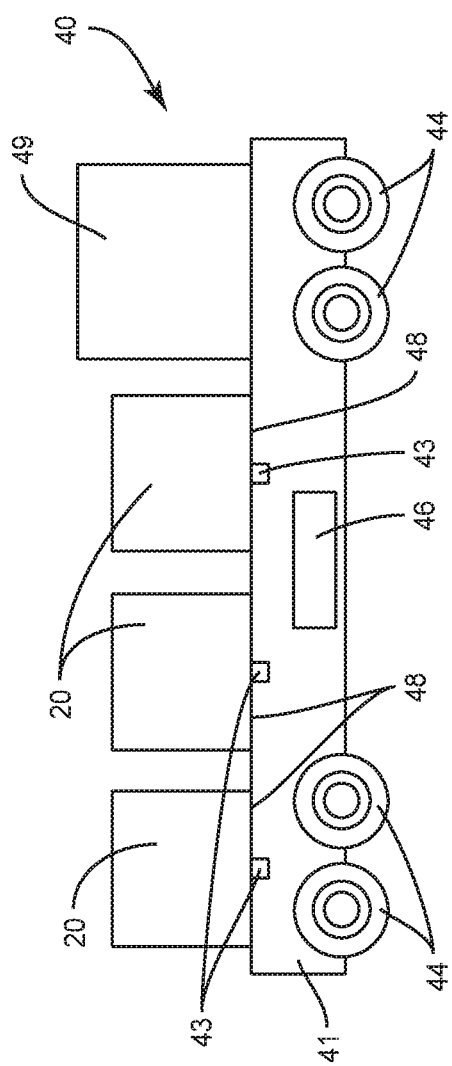
FIG. 18 is a side schematic view of a vehicle connected to multiple pods.

The vehicles 40 can be configured to transport a single pod 20, such as the example of FIGS. 16 and 17. The vehicles 40 can also be configured to transport multiple pods 20. FIG. 18 includes a vehicle 40 that includes an elongated base 41 with multiple receptacles 48. One or more connectors 43 are positioned at each receptacle 48 to connect the pods 20 to the vehicle 40. The vehicle 40 also includes an engine 46 that drives one or more of the wheels 44 for transportation over land. A control position 49 provides a location for a driver and the controls to operate the vehicle 40.

Figure 19:
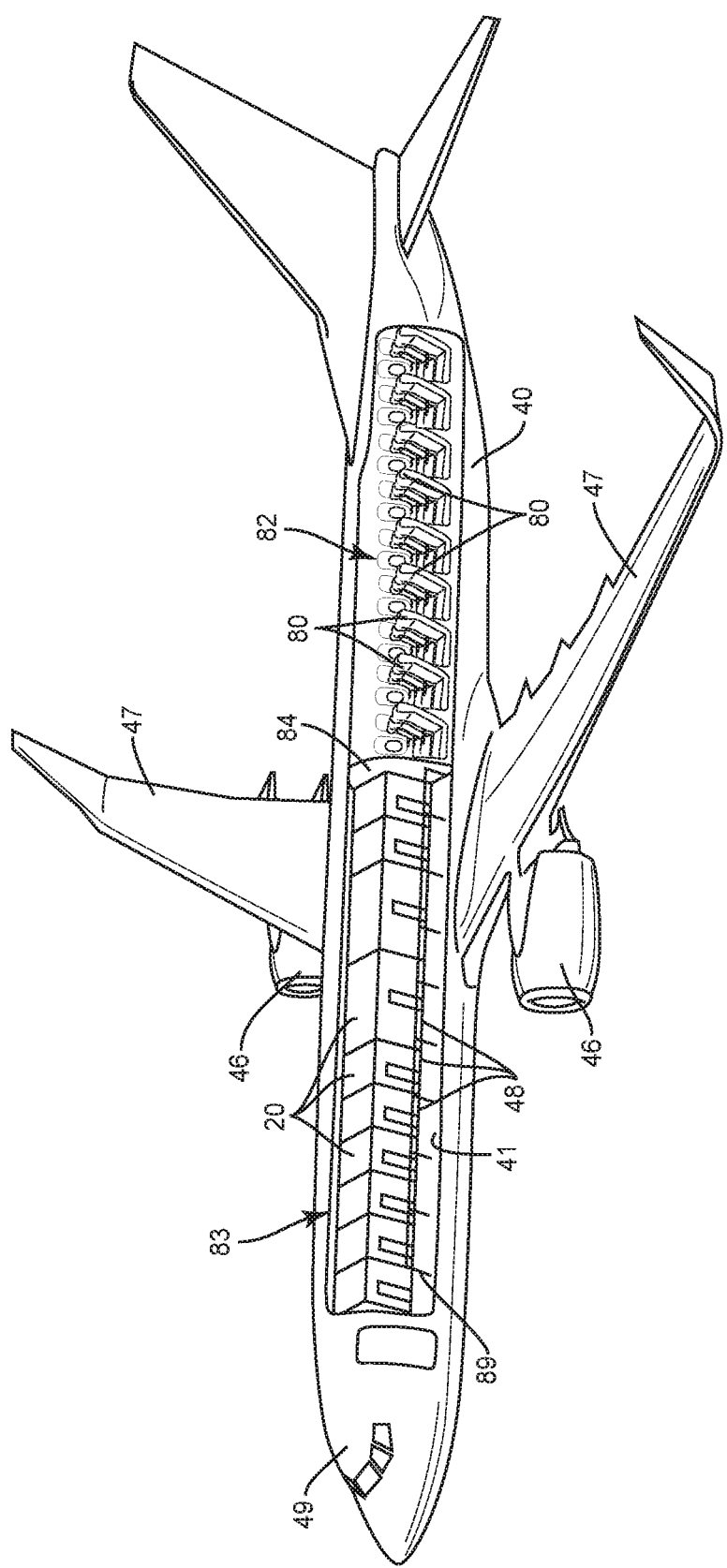
FIG. 19 is a perspective cut away view of an interior space of a vehicle configured to transport pods as well as other travelers.

FIG. 19 illustrates a vehicle 40 configured as an aircraft for flight. The vehicle 40 includes a base 41 and wings 47 with one or more engines 46 equipped for flight. The vehicle 40 also includes multiple receptacles 48 each configured to receive one or more pods 20. One or more doors can lead to the receptacles 48 for loading and unloading the pods 20. The one or more doors are open for loading and unloading of the pods 20, and closed and locked during flight. Connectors 43 engage with the pods 20 to secure the pods 20 to the base 41. A control position 49 that includes a cockpit is positioned at the front of the vehicle 40 to control the vehicle 40.

As further illustrated in FIG. 19, the vehicle 40 is equipped with an interior pod section 83 to transport the pods 20. In one design, the pod section 83 is pressurized to allow the travelers to exit the pods 20 (such as to use restrooms or a lounge). In another design, the pod section 83 is not pressurized but the individual pods 20 are pressurized and thus allow for the use of the pods 20 in commercial aircraft.

The vehicle 40 can also include a cabin 82 with one or more seats 80 for transporting persons. The cabin 82 is the same as that currently available in commercial aircraft and can include seats for each of the persons, lavatories, and a galley. The relative sizes of the pod section 83 and the cabin 82 can vary. FIG. 19 includes an example in which each occupies roughly one-half of the area of the vehicle 40. Other examples can include the cabin 82 and section 83 having various relative dimensions.

In one example, the pod section 83 that is equipped to transport the pods 20 is separate from the cabin 82. A bulkhead wall 84 extends across the interior space of the vehicle 40 to separate the two sections. In another example, the pod section 83 and cabin 82 share the same interior space. A curtain or other minor impediment can be positioned between the sections.

Figure 20:
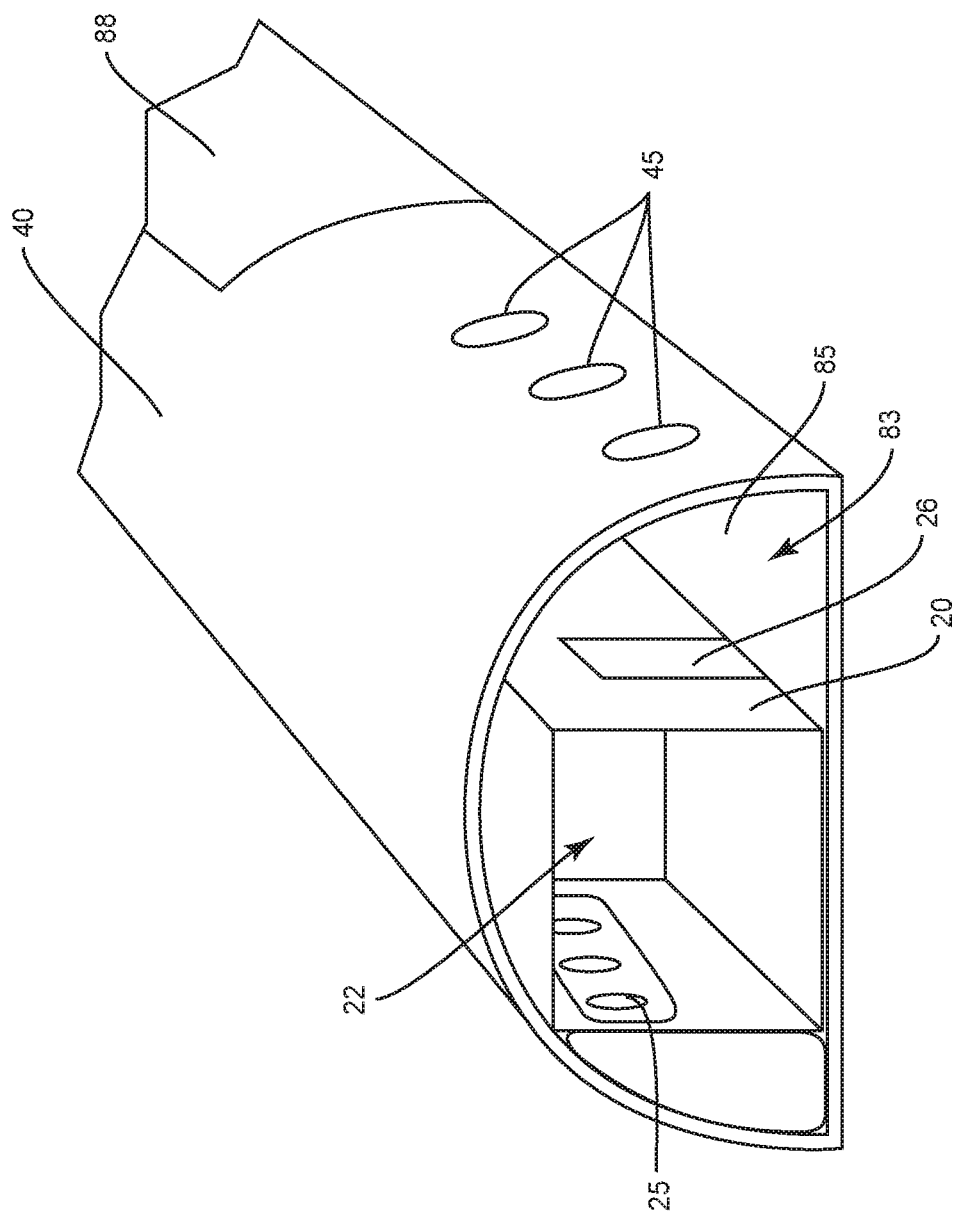
FIG. 20 is a partial section view of a pod positioned within an interior of a vehicle.

FIG. 20 illustrates a pod 20 positioned within a pod section 83 of a vehicle 40. One or more windows 25 on the pod 20 can be aligned with one or more windows 45 on the vehicle 40 to provide for a view for the travelers within the interior space 22 of the pod 20. In one design, the pod 20 is smaller than the pod section 83 thus forming an aisle 85 along the interior of the vehicle 40. A door 26 of the pod 20 can open into the aisle 85 to allow for travelers to exit the pod 20 and move about the vehicle 40 during flight. In one design, the aisle 85 leads along the entire length of the vehicle 40, including the cabin 82.

The pod 20 can be constructed for the interior space 22 to be secure. The wall segments 24 can connect together to provide protection from the environment within the interior space 22. The wall segments 24 can be connected together for the interior space 22 to be airtight to provide for pressurizing the interior space 22 during flight. The various windows 25 and doors 26 can further be locked.

Transportation using a pod 20 can provide for a traveler to remain within the interior space 22 of the pod 20 during travel. The traveler is not interrupted during the travel and can perform various functions that are supported by the interior space 22. Thus the traveler is not exposed to the difficulties of travel and can be productive during this time.

Figure 21:
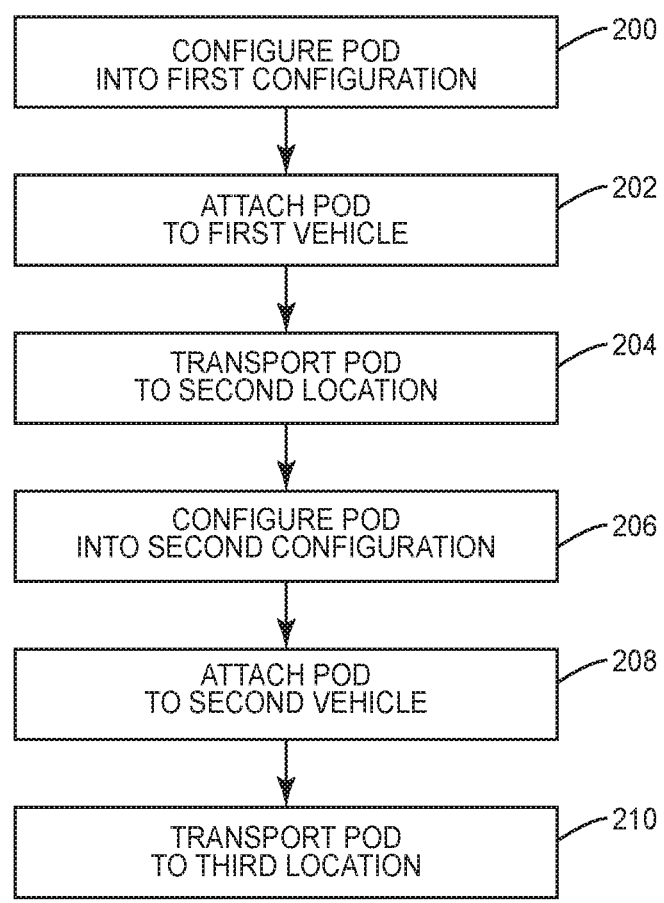
FIG. 21 is a flowchart diagram of a method of transporting one or more persons and/or objects.

The pods 20 can be configured in a variety of different shapes and/or sizes. The reconfiguring can occur prior to the travel and/or during the travel. FIG. 21 includes a method of transporting one or more persons and/or objects. A pod 20 is configured into a first configuration (block 200). This can include connecting together wall segments 24 and forming an interior space 22 with a first layout. After the pod 20 is configured, the pod 20 is attached to a first vehicle 40 at a first geographic location (block 202). The pod 20 is then transported from the first geographic location to a remote second geographic location (block 204). At the second geographic location, the pod 20 is reconfigured into a second configuration (block 206). This can include connecting together the wall segments 24 in a different arrangement and forming the interior space 22 into a different second layout. The pod 20 is attached to a second vehicle 40 (block 208). The pod 20 is then transported by the second vehicle 40 from the second geographic location to a remote third geographic location (block 210).

In one example, reconfiguring the pod 20 is accomplished by one or more partitions 29. The one or more partitions 29 can be moved, added, or removed from the interior space 22 as needed to make the new layout.

The pod 20 can be reconfigured when removed from the vehicles 40, or while attached to one of the vehicles 40. In one example, reconfiguring the pod 20 by repositioning, adding, or removing one or more partitions 29 can occur while the pod 20 is attached to a vehicle 40. More substantial changes that include changes to one or more wall segment 24 can be performed when the pod 20 is detached from a vehicle 40.

In another method, the pod 20 is configured into a first configuration. The pod 20 is then used for transporting travelers and/or objects. The amount of travel can vary. At some point in the future, the pod 20 can be reconfigured to a different second configuration. The pod 20 can then again be used for transporting travelers and/or objects. In one example, the pod 20 is used for transporting just travelers while in a first configuration and for transporting just objects in a second configuration.

In one example, the pod 20 can be equipped to support the traveler while they are at the destination. Thus, the traveler can remain with the pod 20. For example, the pod 20 can include a bed to provide for sleeping. The pod 20 can also include a sink, shower, and toilet to allow the traveler to use the pod 20 in the same manner as a hotel room.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A modular transportation system to transport one or more persons, one or more objects, or a combination of persons and objects, the system comprising:
   a pod comprising wall segments that mount together to form an interior space to house the one or more persons or objects, the wall segments being modular and configured to connect together in a variety of different configurations to selectively configure a shape and size of an exterior of the pod and of the interior space;
   a plurality of vehicles each configured to individually connect to the pod and to transport the pod from a first location to a second location; and
   at least one of the vehicles configured to transport the pod by land and at least one of the vehicles configured to transport the pod by air;
   wherein one or more of the wall segments form the exterior of the pod and are exposed when the pod is connected to the plurality of vehicles;
   wherein one or more of the wall segments comprise:
      one or more floor wall segments;
      one or more roof wall segments; and
      one or more lateral sidewall segments configured to connect to the one or more floor wall segments and the one or more roof wall segments in multiple different locations;
   further comprising one or more partitions configured to be mounted within the interior space at different locations with each of the variety of different configurations comprising the wall segments in a base configuration and the one or more partitions mounted at the different locations within the interior space, the one or more partitions comprising a door for the one or more persons to move between different sections while the pod is being transported by the vehicles.

2. The system of claim 1, wherein
   each of the wall segments comprises an interior side that faces inward towards the interior space and an exterior side that faces outward away from the interior space.

3. The system of claim 2, wherein at least one of the lateral sidewall segments comprises a window that aligns with a window on one of the vehicles when the pod is connected to the vehicle.

4. The system of claim 1, wherein the interior space includes a common square foot area in each of the different configurations of the pod.

5. The system of claim 1, wherein the interior space includes a different square foot area in two or more of the different configurations of the pod.

6. The system of claim 1, wherein one or more of the wall segments comprise openings and one or more of the wall segments comprise extensions sized to fit into the openings, the extensions configured to fit into different ones of the openings to connect the wall segments together in the variety of different configurations to selectively configure the interior space.

7. The system of claim 1, wherein one or more of the wall segments are magnetic to form an electromagnetic shield around the interior space.

8. The system of claim 1, wherein the wall segments are connected together to form a seal for the interior space to be waterproof.

9. The system of claim 1, wherein one or more of the wall segments are opaque and one or more of the wall segments are translucent.

10. The system of claim 1, wherein one or more of the vehicles comprise wheels that are driven by an engine to transport the pod by land and one or more of the vehicles comprise an aircraft engine to transport the pod by air.

11. A modular transportation system to transport one or more persons or objects, the system comprising:
    a pod comprising:
       wall segments that mount together to extend around and form an interior space to house the one or more persons, one or more objects, or a combination of persons and objects,
       the wall segments comprising
          floor wall segments;
          roof wall segments;
          lateral sidewall segments configured to connect to the floor wall segments and the roof wall segments in multiple different locations;
       one or more partitions configured to be mounted relative to the lateral sidewall segments at different locations with each of a variety of different configurations comprising the wall segments in a base configuration and the one or more partitions mounted at the different locations, at least one of the one or more partitions comprising a door for the one or more persons to move between different sections of the interior space;
       a track system comprising slots and extensions positioned on one or more of the wall segments to connect the one or more wall segments together at a variety of different orientations to selectively configure the interior space;
    a plurality of vehicles each configured to individually connect to the pod and to transport the pod from a first location to a second location; and
    at least one of the vehicles configured to transport the pod by land and at least one of the vehicles configured to transport the pod by air;
    wherein one or more of the wall segments are exposed when the pod is connected to and being transported by at least one of the vehicles.

12. The system of claim 11, wherein the wall segments form a first pod section and a second pod section, the first and second pod sections comprise a fixed size and are configured to move relative to one another with the track system to adjust a size of the interior space.

13. The system of claim 12, wherein the first and second pod sections are in a telescoping arrangement.

14. A method of using the modular transportation system for transporting one or more persons, one or more objects, or a combination of persons and objects, the system comprising: a pod comprising wall segments that mount together to form an interior space to house the one or more persons or objects, the wall segments being modular and configured to connect together in a variety of different configurations to selectively configure the interior space; a plurality of vehicles each configured to individually connect to the pod and to transport the pod from a first location to a second location; and at least one of the vehicles configured to transport the pod by land and at least one of the vehicles configured to transport the pod by air; the method comprising:
    configuring the pod into a first configuration by connecting together the wall segments and forming the interior space with a first layout;

attaching the pod to a first vehicle of the plurality of vehicles at a first geographic location and transporting the pod from the first geographic location to a remote second geographic location;

at the second geographic location, reconfiguring the pod into a second configuration by connecting together the wall segments in a different arrangement and forming the interior space into a different second layout; and attaching the pod to a second vehicle of the plurality of vehicles at the second geographic location and transporting the pod from the second geographic location to a remote third geographic location.

15. The method of claim 14, further comprising transporting the pod by land from the first geographic location to the second geographic location and transporting the pod by air from the second geographic location to the third geographic location.

16. The method of claim 14, further comprising changing a size of an area of the interior space when reconfiguring the pod from the first configuration to the second configuration.

17. The method of claim 16, further comprising sliding one or more of the wall segments along a slot in another one of the wall segments and changing the interior space from the first configuration to the second configuration.

18. The method of claim 14, further comprising attaching a floor of the pod to the first vehicle and the second vehicle and maintaining an orientation of the interior space when transporting the pod from the first geographic location to the third geographic location.

19. The method of claim 14, further comprising mounting one or more partitions to one or more of the wall segments and changing the pod from the first configuration to the second configuration without adjusting the wall segments.

20. The system of claim 11, wherein the wall segments are connected together to form a seal for the interior space to be waterproof.

* * * * *